US006269330B1

(12) United States Patent
Cidon et al.

(10) Patent No.: US 6,269,330 B1
(45) Date of Patent: Jul. 31, 2001

(54) FAULT LOCATION AND PERFORMANCE TESTING OF COMMUNICATION NETWORKS

(75) Inventors: Israel Cidon; Moshe Sidi, both of Haifa (IL)

(73) Assignee: Attune Networks Ltd., Ramat Gan (IL)

(*) Notice: Subject to any disclaimer, the term of this patent is extended or adjusted under 35 U.S.C. 154(b) by 0 days.

(21) Appl. No.: 09/164,488

(22) Filed: Oct. 1, 1998

(51) Int. Cl.[7] ............... H02H 3/05; H03K 19/003; H04B 1/74; H04L 1/22; H05K 10/00

(52) U.S. Cl. ............... 704/43; 370/248; 709/224; 709/225; 714/712

(58) Field of Search .................. 714/712, 716, 714/25, 31, 43, 26; 395/200.54; 370/13, 241, 248; 455/424, 423, 67.4, 69, 70; 379/5, 9, 265, 266–267, 27, 34, 4, 28; 702/122; 709/223–225, 238

(56) References Cited

U.S. PATENT DOCUMENTS

| | | | |
|---|---|---|---|
| 4,055,808 | 10/1977 | Holsinger et al. ............. 325/67 |
| 4,112,264 | * 9/1978 | Abramson et al. ............ 179/175.3 |
| 4,545,011 | 10/1985 | Lyon et al. .................... 364/200 |
| 4,545,013 | 10/1985 | Lyon et al. .................... 364/200 |
| 5,027,343 | 6/1991 | Chan et al. ..................... 370/17 |
| 5,271,000 | 12/1993 | Engbersen et al. ............ 370/13 |
| 5,289,474 | * 2/1994 | Purcell et al. ................. 714/716 |
| 5,477,531 | 12/1995 | McKee et al. ................. 370/17 |
| 5,544,310 | 8/1996 | Forman et al. ................. 714/31 |
| 5,600,632 | 2/1997 | Schulman ..................... 370/252 |
| 5,627,766 | 5/1997 | Beaven ....................... 364/551.01 |
| 5,710,885 | 1/1998 | Bondi ......................... 709/224 |
| 5,732,213 | 3/1998 | Gessel et al. . |
| 5,812,529 | 9/1998 | Czarnik et al. ............... 370/245 |
| 5,838,919 | 11/1998 | Schwaller et al. . |
| 5,872,931 | * 2/1999 | Chivaluri ..................... 395/200.53 |
| 5,881,081 | * 3/1999 | Arrowood et al. ............ 370/248 |
| 5,881,237 | 3/1999 | Schwaller et al. ............ 395/200.54 |

FOREIGN PATENT DOCUMENTS

| | | | |
|---|---|---|---|
| 10133713 | 10/1996 | (JP) | G05B/19/00 |
| 9026942 | 7/1997 | (JP) | G06F/15/16 |
| WO 80/01615 | 7/1980 | (WO) | G06F/11/26 |

OTHER PUBLICATIONS

Abstract of JP 9026942 A.
Abstract of JP 10133713 A.
Aneroussis, N. et al., "Taming Xunet III," *ACM Computer Communication Review*, Jul. 1995, pp. 1–22.
Bernstein, S. et al., "NU: A Network Monitoring, Control, and Management System," presented at the IEEE ICC–83 Conference, 1983, pp. 478–483.
Di Concetto, M. et al., "Testing Methods and Equipment for ATM Switching Nodes," *Communication Networks*, vol. 5, No. 3, May–Jun. 1994, pp. 81–89.

(List continued on next page.)

*Primary Examiner*—Albert Decady
*Assistant Examiner*—Guy Lamarre
(74) *Attorney, Agent, or Firm*—Flisler, Dubb, Meyer & Lovejoy LLP

(57) ABSTRACT

A method and apparatus for testing a network having a plurality of nodes. The method includes sending commands to one or more traffic agents connected to the network and to at least one network management agent coupled to a respective node of the network, transmitting data from at least one of the traffic agents over the network responsive to the commands, determining network information at the at least one network management agent responsive to the commands and to transmission of the data through the respective node, and receiving and evaluating the network information to assess a state of the network.

44 Claims, 7 Drawing Sheets

OTHER PUBLICATIONS

Hornbeek, M. et al., "Performance and Conformance Test Tools for DPN Packet Networks," *New Communication Services: A Challenge to Computer Technology*, N. Holland, 1986, pp. 514–518.

Hornbeek, M. et al., "A Tool Kit for Testing Data Products," *Telesis*, 1985, pp. 14–21.

Hornbeek, M.W.A., "An Integrated Test Center for SL–10 Packet Networks," ACM, 1985, pp. 108–114.

Johnson, J., "Cisco Ping MIB File," May 1994, pp. 1–7.

Lazar, A.A., "Real–Time Traffic Measurements on MAGNET II," published in IEEE Journal on Selected Areas in Communications, Apr. 1990, pp. 1–27.

Paxson, V., "End–to–End Routing Behavior in the Internet," presented at the SIGCOMM conference (Aug. 1996), pp. 25–28.

Richman, S., "A Comparison of Field Performance Measurements of Multi–National Packet Switching Networks," GLOBECOM '87, pp. 1627–1634.

Richman, S.H. et al., "Packet–Aspen—A Packet Switching Field Performance Measurement Tool," presented at the IEEE ICC–85 Conference, 1985, pp. 298–304.

Seo, K. et al., "Distributed Testing and Measurement Across the Atlantic Packet Satellite Network (SATNET)," presented at SIGCOMM (1988), pp. 235–246.

Waldbusser, S., "Remote Network Monitoring Management Information Base," Request for Comments (RFC 1271) of the Network Working Group (Nov. 1991), pp. 1–18.

Wurzenberger, J et al., "Experience and Measurement of Quality of Service Parameters in the Packet Switching System EWSP," presented at the International Conference on Computer Communication (New Delhi, 1990), pp. 105–111.

* cited by examiner

FAULT LOCATION AND PERFORMANCE TESTING OF COMMUNICATION NETWORKS

FIELD OF THE INVENTION

The present invention relates generally to communication networks, and specifically to testing and fault discovery in communication networks.

BACKGROUND OF TEE INVENTION

Communication networks are in wide use in many technological fields including distributed computing, data exchange and telecommunication applications. Communication networks generally include a plurality of nodes, such as bridges, LAN switches, routers, cross-connections and telephone switches. The networks further include communication links, such as cables, point-to-point radio connections and optical fibers, which connect the nodes. The networks also include ports, generally within some of the nodes, for attaching external devices such as computers, terminals, handsets, and multiplexers referred to as end-points (or hosts).

Networks are becoming increasingly complex, especially due to their increasing speeds of operation, the number of units interconnected by a network and the formation of large networks from different types of sub-networks. In addition, the networks may transmit concurrently various types of data such as text, voice, video and other multimedia files. In order to allow for these different types of data, some networks are designed to provide different amounts of bandwidth and different levels of quality of service.

A major issue with newly deployed and existing communication networks is testing and trouble-shooting, i.e., checking whether the network is operating according to its specifications and, if not, determining the cause of the network's inadequate performance (for example, the identity of a faulty unit).

Simulators such as "BONeS," produced by Cadence, San Jose, Calif., and "OPNET," produced by MIL3, Washington, D.C., allow creation of models of a network, and subsequent testing of the network based on these models. An operator provides the simulator with a map of the network, which includes its components, specifications and expected data traffic patterns. The simulator provides performance estimations of the entire network, together with performance estimations of the network under various constraints, such as a non-operating node or link. Such performance estimation under constraints is referred to as "what-if" analysis. However, simulators do not usually cover all aspects of the simulated networks and are limited in the network size which may be simulated. In addition, simulators are able to detect only design faults, not operational faults.

Application performance measurement tools, such as "Chariot," produced by Ganymede, Research Triangle Park, N.C., and "Webload" and "Webexam," produced by Radview, Tel Aviv, Israel, evaluate the performance of existing or new applications as they are introduced into the network. However, they do not test the network itself independent of specific applications. In addition, they do not provide "what-if" analysis capabilities.

Dedicated point-to-point testing equipment is a commonly-used network testing tool. Such equipment is described, for example in U.S. Pat. No. 5,477,531, which is incorporated herein by reference. Usually, dedicated point-to-point testing equipment requires two users who coordinate their operations in order to identify a misbehaving component of the network. Moreover, to test a large network, the testing equipment must be moved between many ports of the network.

Passive network monitoring devices based on network management software, such as "HP-OpenView," produced by Hewlett Packard, Palo Alto, Calif., and "Soltice Enterprise Manager," produced by Sun Microsystems, Mountain View, Calif., are also in very common use. These devices are used in network troubleshooting, but they are passive and cannot test a network which is not in use.

SUMMARY OF THE INVENTION

It is an object of some aspects of the present invention to provide methods and apparatus for locating faults within communication networks.

It is another object of some aspects of the present invention to provide methods and apparatus for evaluation of the performance of communication networks.

It is yet another object of some aspects of the present invention to provide methods and apparatus for automatic detection of faults in a communication network.

It is still another object of some aspects of the present invention to provide methods and apparatus for systematic evaluation of the performance of a communication network.

It is still another object of some aspects of the present invention to provide methods and apparatus for evaluation of the performance of a communication network from a single central site.

In preferred embodiments of the present invention, a distributed testing system for evaluating and/or testing a communication network comprises a plurality of traffic agents coupled to nodes and/or hosts of the network. The traffic agents act as artificial users of the network by, for example, transmitting and receiving packets of data, establishing connections, and determining traffic statistics. The testing system further comprises one or more network management (NM) agents coupled to nodes (and possibly to hosts) of the network, which provide information on the interior state of the network. The network management agents preferably monitor the state of the node to which they are coupled, and monitor and possibly copy the traffic that passes through the node. The network management agents preferably also accept commands to configure the node to which they are coupled in terms of its communication abilities.

The testing system further comprises a testing center which conducts tests of the network. The testing center controls the operations of the traffic agents and NM agents by sending them commands or groups of commands, referred to herein as subscripts. In response to the commands, the traffic agents and/or NM agents perform actions and generate reports relating to the network and the traffic therethrough and send the reports to the testing center. The testing center uses the reports from the agents to determine additional tests to be performed and/or to evaluate the state of the network and generate test results which are provided to an operator. Preferably, the testing center stores a plurality of pre-written sets of instructions, referred to herein as scripts, each of which is directed to conduct a specific test session.

The distributed testing system of the present invention provides an operator with the ability to perform a large range of tests on the communication network from substantially any location, by simply connecting to the testing center and invoking one or more scripts at the testing center. Interacting solely with the testing center, the operator may initiate network-wide tests which include transmitting data over the network from various points of the network, and determining the behavior of the generated data and/or other data. Thus, the testing center and/or the operator may detect faults in the network and/or evaluate the performance of the network, based on reports received from agents which are preferably distributed throughout the network.

The stored test scripts allow systematic testing of the network according to stored tests which are prepared for various scenarios. The test scripts include sequences of software instructions written in a scripting programming language, such as Tcl, Javascript or Perl. The test scripts include the subscripts and/or commands to be sent to the traffic agents and NM agents together with control instructions which indicate for example, execution times and conditions of instructions of the script.

Preferably, some scripts invoke by reference other scripts, so that smaller scripts may be used as building blocks to create larger scripts. An operator attempting to find a new type of fault in the network may use a set of existing scripts to perform a more complex test session which will find the fault. Preferably, the testing center records the instructions and scripts invoked by the operator, in order to compose additional scripts which may be used at a later time by the operator when a similar fault is encountered. Further preferably, the operator may edit the scripts and/or prepare additional scripts. The testing center preferably also stores results of previously performed tests, so that test results of a current test may be compared to the previously-acquired test results.

Preferably, the testing center communicates with the plurality of agents by means of the network which is being evaluated. Alternatively or additionally, the testing center communicates with the plurality of agents via connections independent of the network.

Further preferably, the traffic agents are implemented as software processes within hosts connected to the network, and/or the agents are embedded as software processes at nodes of the network. Alternatively or additionally, the traffic agents are implemented as stand-alone hardware or as hardware cards embedded within the hosts and/or nodes.

In some preferred embodiments of the present invention, the traffic agents comprise one or more traffic generators coupled to respective ports of the network. The traffic generators transmit digital data, preferably in packets or bit streams, and/or transmit connection establishment requests destined for other network endpoints. The traffic generators generate and transmit the digital data according to commands received from the testing center. Such commands may include times of transmission, as well as amounts of data to be transmitted in definite or statistical terms. The digital data transmitted as payload may include random bits and/or repetitions of predetermined sequences of data, useful in testing the network.

Alternatively or additionally, the digital data include test information which is useful in analysis of the state of the network. Such information may include, for example, the exact transmission time of the digital data, a sequence number of the data in a packet stream, and information regarding the stream including the packet, such as the number of blocks in the stream, the identity of the start and end packets of the stream, and information regarding the nature and generation timing of future data in the stream. Optionally, the traffic generators transmit data using multicasting and/or broadcasting, as is known in the art.

In some preferred embodiments of the present invention, the traffic generators can also communicate with hosts of the network which do not form part of the testing system. Such traffic generators preferably emulate digital data generated in accordance with standard protocols of various network applications, such as electronic mail (SMTP), database query (SQL), ping, TCP, UDP, HTTP, etc.

Preferably, the traffic agents further include one or more traffic analyzers, which receive data packets or signals from the network and measure and determine the nature, timing and contents of the data according to commands from the testing center. The traffic analyzers may receive all data passing over the network to the port to which they are connected, or only data which were generated by traffic generators. Preferably, the traffic analyzers accept requests for connection establishment and measure and determine the behavior of connections established with the analyzer or with endpoints coupled thereto.

The traffic analyzers generate and send to the testing center reports describing features of the received data. These reports are used by the testing center to evaluate the network. The contents of these reports, as well as their number and forn, are in accordance with commands from the testing center. The traffic analyzers may generate a single report after an entire test session or a part of the test session, or they may generate multiple reports, periodically or otherwise. Preferably, the traffic analyzers receive only specific data and/or generate the test reports regarding only specific data identified in the commands. Such specific data may include data which conform with one or more specific protocols, originate from specific traffic generators, or have other distinctive features. Preferably, the traffic agents determine and report a level of service of the network in terms of quality measures such as throughput, response time, etc. Alternatively or additionally, the traffic analyzers determine a level of service in terms of quality measures of an existing application.

In some preferred embodiments of the present invention, a single combined traffic agent operates both as a traffic generator and a traffic analyzer. Preferably, the combined traffic agent may receive a single subscript which includes commands directed both to the generator and analyzer parts of the combined traffic agent. Further preferably, the commands to the combined agents include commands which take advantage of the interaction between the traffic analyzer and the traffic generator. For example, the traffic generator may transmit data and/or connection requests in response to reception of data at the traffic analyzer. Similarly, the traffic analyzer may prepare reports describing the data transmitted from the traffic generator, or including other information from the traffic generator. Alternatively or additionally, some traffic agents operate as traffic generators while other traffic agents operate as traffic analyzers.

In some preferred embodiments of the present invention, one or more of the traffic agents are embedded agents which are not connected to ports of the network, but rather are coupled to nodes of the network. Preferably, the embedded traffic agents have a defined address in the network and transmit and receive data like any host connected to ports of the network.

In some preferred embodiments of the present invention, the traffic agents receive subscripts written in accordance with a general programming language. For example, the subscript may include execution time indications and condition statements. Preferably, subscripts which are not accompanied by a time indication are performed immediately when they are received at the agent or immediately after any previously received commands. The commands to the traffic agents are preferably in accordance with a known taxonomy which allows large flexibility in the commands.

Preferably, the network management agents are implemented as standard built in software processes within network nodes and/or hosts, as are known in the art. Preferably, the testing center communicates with the NM agents using standard management protocols, such as SNMP (Simple Network Management Protocol), CMIP (Communication Management Information Protocol) and/or RMON (Remote Monitoring). Alternatively or additionally, the network management agents are implemented as specially designed software or hardware coupled to the nodes of the network.

In some preferred embodiments of the present invention, the NM agents may alter the configuration of the network, and preferably have the total control of the network nodes, as is known in the art. For example, the NM agents preferably activate and/or deactivate links of the network. Additionally, the NM agents may control communication properties of the nodes, such as the service levels, operational status and priorities assigned to different data packets passing through the nodes. The NM agents are also preferably able to configure nodal tables, addresses and policies.

Preferably, the NM agents have capturing, filtering and/or masking capabilities to identify, store and/or count data packets with specific characteristics. Further preferably, the NM agents also have full monitoring capabilities for traffic that passes through their respective nodes. The monitoring preferably includes, but is not limited to, counting and/or measuring data packets according to one or more parameters, such as their source, destination, application type or a general bit pattern included in the packets. Alternatively or additionally, the monitoring includes copying and/or capturing individual data packets according the one or more parameters. Preferably, in connection-oriented networks, the NM agents identify, monitor and/or measure call establishment requests and setups that pass through the node to which they are coupled.

Preferably, the network management agents generate reports describing the traffic passing through their respective nodes. These reports are generated according to commands received from the testing center. The NM agents may generate a single report at the end of a test session (or a part thereof) or may generate multiple reports during the test sessions. Preferably, such reports are generated according to network management standards known in the art.

Preferably, all of the commands to be performed by each of the traffic agents during a single test session are sent to the agents prior to the test session. Alternatively, the test session includes a plurality of steps and subscripts that are sent to the agents during the test session, generally between execution of some or all of the steps of the session. Some of the subscripts are preferably generated responsive to reports received by the testing center from traffic agents and network management agents during prior steps of the test session.

In some preferred embodiments of the present invention, one or more of the embedded traffic agents operates in association with a network management agent coupled to the same node as the embedded traffic agent. Preferably, the embedded agent and NM agent pass data and commands between them and otherwise operate in coordination. Alternatively or additionally, a common software package implements both the NM agent and the embedded traffic agent.

Preferably, the testing center comprises a software package which runs on one of the computer hosts attached to the network, preferably, a computer host that is generally used for the task of network management.

In some preferred embodiments of the present invention, the testing system automatically carries out pre-stored scripts, periodically or in response to problems encountered in the network. Preferably, the testing center performs pre-stored scripts in response to alarms from a network management system or NM agents.

In some preferred embodiments of the present invention, before automatically initiating a test session, the testing center verifies that the test session will not significantly impede operation of the network. Preferably, automatically-invoked scripts include a beginning set of conditional instructions which adapt the test or terminate the test responsive to the state of the network. Specifically, the testing center preferably determines the volume of traffic at important areas of the network by polling the network management agents in those areas. If the volume does not fulfill predetermined conditions, e.g., the traffic volume is too high, then the test session is deferred to a later time. Preferably, scripts which are directed to relatively heavy traffic test sessions include, between some steps of the test, instructions to check the volume of the traffic in the network and to defer steps of the test to a later time when the traffic volume is found to be lower.

In some preferred embodiments of the present invention, various scripts may be used to test and/or evaluate different aspects of a network. For example, some scripts may be directed to testing of specific hardware components, while other scripts may be directed to testing of network control software or network application software. Alternatively or additionally, different scripts may be used to test different protocol layers of the communication protocol of the network and/or different applications which use the network.

In some preferred embodiments of the present invention, the testing center includes a user interface, preferably a graphical user interface, which allows a user to create, in a simple manner, scripts for future use and/or to perform real-time interactive testing sessions. In addition, the user interface preferably presents test results based on reports received from the traffic agents and/or statistical data based on the received reports.

Preferably, the user interface comprises a graphical interface which includes, for example, drag- and-drop features that allow the user to easily build scripts. Further preferably, the user interface displays a topological picture of the network on which the user may indicate, using a pointing device, traffic agents to be used in a next step of the test, NM agents to be polled, hosts to be addressed, links or nodes to be enabled or disabled, etc. Preferably, a pop-up menu for each selected agent allows the user to define traffic and connection parameters including quality of service, traffic duration, traffic patterns, applications to be invoked, etc. Preferably, the user may also modify parameters of existing scripts.

Preferably, the user interface and/or the testing center software include definitions of groups of traffic agents and/or of network management agents, which allow subscripts to be easily sent to an entire group of agents. Such groups may include, for example, all of the NM agents coupled to switches and/or routers, all of the traffic agents located in a given physical area or in a given address range, all of the traffic agents associated with hosts performing specific functions, such as mail or file servers, or any arbitrary group chosen by the user. Preferably, an instruction in a script may send subscripts to a specified number of agents in a group rather than to the entire group. When such a number is stated, the testing center selects the recipient agents randomly or according to a predetermined rule. The predetermined rule may be a method to choose the most sparse units in terms of the network topology or a method to choose a concentrated group.

In some preferred embodiments of the present invention, a script includes commands establishing a connection at a specific standard of quality of service (QoS) and/or service level agreement (SLA) and instructing one or more of the network management agents along the connection to report to the testing center regarding data flow through the connection. The reports from the NM agents are preferably used to determine whether the QoS and/or SLA are achieved. Preferably, the testing center further determines the delay, data loss ratio and/or jitter of the transmitted data. If the results violate the contracted service level, the testing center executes a script which correlates the reports from multiple NM agents along the path to discover the specific misbehaving node. Alternatively or additionally, the testing center instructs, sequentially, embedded traffic agents associated with nodes along the connection path to form connections, and these connections are tested in order to find a link or path segment which is responsible for the service agreement violation.

There is therefore provided in accordance with a preferred embodiment of the present invention, a method for testing a network having a plurality of nodes, including sending commands to one or more traffic agents connected to the network and to at least one network management agent coupled to a respective node of the network, transmitting data from at least one of the traffic agents over the network responsive to the commands, determining network information at one or more nodes of the network responsive to the commands and to transmission of the data through the respective node, and receiving and evaluating the network information to assess a state of the network.

Preferably, sending the commands includes sending commands to the one or more traffic agents and to the at least one network management agent from a single source.

Preferably, sending the commands includes sending commands over the network.

Preferably, the method includes receiving at least some of the transmitted data in at least one of the traffic agents and deriving additional network information at the traffic agent which received the data, responsive to the commands.

Preferably, deriving the additional network information includes determining a response time property of the transmitted data.

Preferably, determining network information includes capturing data transmitted by at least one of the plurality of the traffic agents.

Preferably, transmitting the data includes multicasting the data.

Preferably, sending the commands includes sending a pre-stored subscript of commands.

Preferably, sending the subscript includes sending a subscript which includes execution times for at least some of the commands.

Preferably, sending the subscript includes sending a subscript which is written in accordance with a general programming language.

Preferably, sending the commands to the at least one network management agent includes sending commands according to a public network management standard.

Preferably, sending the commands includes sending commands in accordance with a script.

Preferably, sending the commands includes initiating the script responsive to an alarm generated by the network, most preferably an alarm generated by a network management system.

Preferably, the script includes instructions to be performed in a plurality of test stages, and at least one of the test stages is chosen responsive to results of a previous test stage.

Preferably, sending the commands includes sending at least one of the commands responsive to the received network information.

Preferably, sending the at least one of the commands includes sending commands responsive to a measure of an amount of traffic passing through the network.

Preferably, the method includes sending a command to a network management agent to change a traffic characteristic of the network at one or more of the plurality of nodes.

Preferably, changing the traffic characteristic includes altering the operability of a link of the network.

Preferably, evaluating the network information to assess the state of the network includes determining whether a first part of the network operates properly by disabling a second part of the network and transmitting the data through the first part while the second part is disabled.

Preferably, transmitting the data includes transmitting data according to a statistical transmission time pattern.

Alternatively or additionally, transmitting the data includes transmitting a request to establish a communication connection.

Preferably, transmitting the data includes transmitting data in accordance with a standard application protocol.

Preferably, evaluating the network information includes determining whether a fault in the network is in the application or in the network.

Preferably, transmitting the data includes transmitting at least one packet of data which includes one or more fields of test information.

Preferably, the test information includes a time stamp, a sequence number or a connection identification.

Preferably, the method includes receiving the transmitted data at one of the traffic agents and determining network-related performance information at the traffic agent which received the transmitted data responsive to the commands and the test information.

Preferably, evaluating the network information to assess the state of the network includes locating a network fault.

There is further provided in accordance with a preferred embodiment of the present invention, apparatus for testing a network having a plurality of nodes, including a plurality of traffic agents which generate and transmit data over the network, one or more network management agents coupled to respective nodes of the network, which determine network information at the node, and a testing center which sends commands to the plurality of traffic agents to generate and transmit the data and to the at least one network management agent to determine the network information, and which receives and evaluates the network information from the at least one network management agent so as to assess performance of the network.

Preferably, the testing center sends the commands over the network.

Preferably, at least one of the traffic agents receives the transmitted data and derives additional network information, responsive to commands from the testing center.

Preferably, the network information includes a response time property of the transmitted data.

Preferably, the network information includes a throughput of the transmitted data.

Preferably, at least one of the traffic agents multicasts the data.

Preferably, the testing center includes a memory in which one or more scripts of instructions are stored.

Preferably, the testing center includes a user interface which enables a user to invoke the scripts.

Preferably, the user interface includes a graphical user interface which allows a user to create some or all of the scripts.

Preferably, the graphic user interface allows the user to change parameters of the scripts.

Preferably, at least one of the network management agents changes a traffic characteristic of the network responsive to the commands.

Preferably, the at least one of the network management agents alters the operability of a link of the network.

Preferably, the at least one of the network management agents captures the transmitted data.

Preferably, the network management agent includes a Remote Monitoring agent.

Preferably, the plurality of traffic agents include at least one traffic agent which is internal to a node of the network.

Preferably, the plurality of traffic agents include at least one traffic agent which is implemented as an integral part of one of the network management agents.

The present invention will be more fully understood from the following detailed description of the preferred embodiments thereof, taken together with the drawings, in which:

DETAILED DESCRIPTION OF PREFERRED EMBODIMENTS

Figure 1:
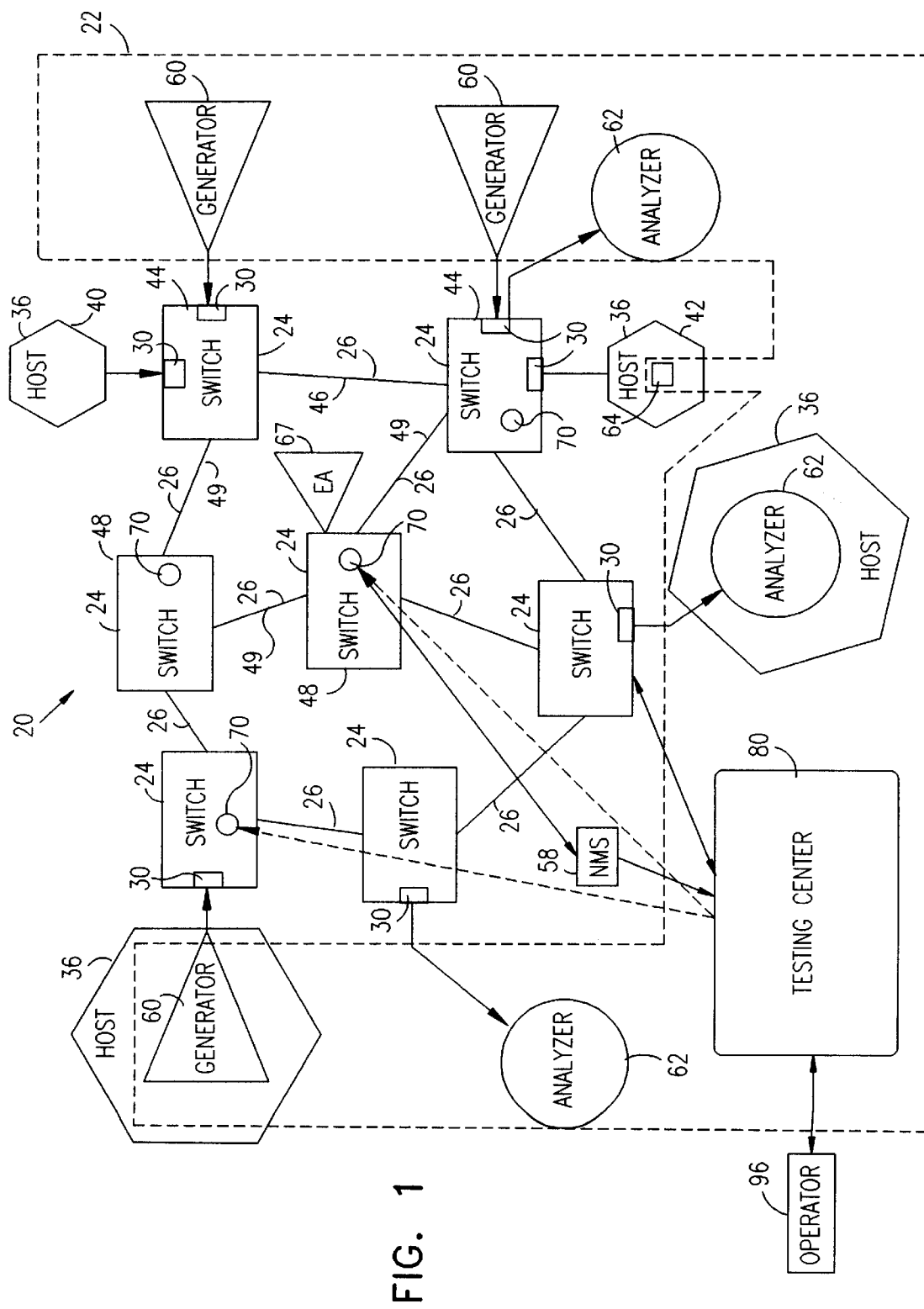
FIG. 1 is a schematic graph of a communication network with a testing system, in accordance with a preferred embodiment of the present invention.

FIG. 1 is a schematic block diagram of a communication network 20, with a testing system 22 coupled thereto, in accordance with a preferred embodiment of the present invention. Network 20 comprises a plurality of switches 24 which are interconnected by a plurality of links 26. Switches 24 may comprise, for example, ATM switches (manufactured by FORE Systems, Warrendale, Pa.), Internet routers and Ethernet switches (manufactured by Cisco, Santa Clara, Calif.), and/or telephone switches (manufactured by Lucent Technologies, Murray Hill, N.J.). Alternatively or additionally, switches 24 may be replaced by other nodes, such as bridges, hubs, routers, etc. Links 26 comprise any type of physical or logical connections, such as twin cables, optical fibers, wireless and cable broadcast channels as well as frame relay and Internet connections leased from service providers.

Some of switches 24 comprise ports 30 which may be connected to external apparatus, while other switches 24, such as switches 48, are connected only to other switches. Network 20 comprises one or more hosts 36, which are coupled to ports 30 and which may be, for example, terminals, computers, hand-sets, etc.

Hosts 36 transmit packets of digital data over network 20. Generally, the packets are passed from a source host to a destination host via a path of switches 24 and links 26. Each switch preferably has a routing table which is used to direct the packets toward the destination hosts of the packets. For example, when a host 40 transmits a packet to a host 42, the packet may traverse a route which passes over link 46 and through switches 44, or the packet may pass through switches 44 and 48 over links 49. In other networks, multiple routes may be used concurrently from one host to another.

Network 20 preferably comprises a packet (or datagram) switched network in which there is no need to establish a connection before packets are sent. Alternatively or additionally, network 20 comprises a connection-oriented network, e.g. a telecommunication or ATM (Asynchronous Transfer Mode) network, in which a connection must be established before packets are sent.

Preferably, network 20 comprises a network management station (NMS) 58 which monitors the operation of the network. Network management station 58 may generate, for example, alarms in response to faults detected in the network.

Testing system 22 comprises a plurality of end-point traffic agents including traffic generators 60 and traffic analyzers 62, which are coupled to ports 30 of network 20. Traffic generators 60 transmit data over network 20, and traffic analyzers 62 receive data, as described hereinbelow, in order to test the network. Alternatively or additionally, testing system 22 comprises one or more combined traffic agents 64 which operate as both generators and analyzers. As indicated in FIG. 1, traffic agents 60, 62 and 64 may be implemented as part of hosts 36, either as additional hardware, such as add-on cards, or as software packages within the hosts. Although for most testing purposes, software packages are sufficient to implement traffic agents 60, 62 and 64, when network 20 is a very fast network, such as an ATM or a Gigabit Ethernet network, high-speed devices are required for full-scale testing of the network. Therefore, in such fast networks some or all of traffic agents 60, 62 and 64 preferably comprise add-on hardware devices.

Alternatively or additionally, end-point traffic agents 60, 62 and 64 may be implemented as stand-alone devices, independent of hosts 36. Such stand-alone agents may be used, for example, when special equipment is connected temporarily to network 20 for testing purposes. Preferably, system 22 also includes embedded traffic agents (EA) 67 which connect to switches 24 directly, not through a port 30. In all other aspects, embedded agents 67 are preferably the same as traffic agents 60, 62 or 64.

Testing system 22 further comprises one or more network management (NM) agents 70, which are associated with one or more of switches 24. For simplicity, NM agents 70 in FIG. 1 are not enclosed in the dashed line designating testing system 22 Preferably, network management agents 70 monitor, measure, and analyze the data and/or communication connections passing through the switches 24 to which they are coupled. NM agents 70 preferably have capturing and filtering capabilities which allow them to identify and/or count data packets from a specific link, or a specific origin, or data packets with specific properties. Further preferably, network management agents 70 include an RMON (Remote Monitoring) extension or other software or hardware extension which allows the network management agent to determine a profile of the data traffic through switch 24, including the amount of data headed to each different destination.

Preferably, network management agents 70 control components of their respective switches 24, most preferably by changing entries in configuration tables of the switch. Thus, for example, an NM agent 70 may activate or deactivate a link 26, change the queuing and/or the priority properties at the link, and/or change the quality of service (QoS) features of the respective switch 24 and its links.

Preferably, NM agents 70 comprise standard network management agents which are normally included in networks for interaction with NMS 58. Preferably, NM agents 70 include embedded SNMP (Simple Network Management Protocol), CMIP, RMON or Java agents implemented as parts of switches 24 of network 20. Preferably, NM agents 70 receive commands according to a public network management standard; for example, embedded SNMP agents receive commands in accordance with the standard SNMP client/server mode of operation. These SNMP commands include: Get Request, Get Next, Set Request, Get Response and Event/Trap, as are known in the art and described, for example, in "SNMP, SNMPv2 and RMON, Practical Network Management," by William Stallings (Second Edition, Addison Wesley, 1996), which is incorporated herein by reference.

Alternatively or additionally, in telecommunication and telephony networks, network management agents 70 comprise CMIP or TMN (Telecommunication Management) software agents, as are known in the art. Further alternatively or additionally, network management agents 70 comprise specially-designed interface equipment compatible with switches 24.

Testing system 22 further includes a testing center 80 which is preferably implemented as a software process executed at a management host. The host of testing center 80 preferably comprises a graphical workstation or a personal computer. Preferably, testing center 80 communicates through network 20 with traffic agents 60, 62, 64, and 67 and with NM agents 70. Alternatively or additionally, different communication apparatus independent of network 20, such as modem dialup lines or Internet connections, are used to communicate with some or all of the traffic agents.

Testing center 80 preferably conducts test sessions by transmitting one or more commands, referred to herein as subscripts, to at least some of traffic agents 60, 62, 64, and 67, and NM agents 70, and subsequently receiving reports from the traffic and NM agents. Preferably, testing center 80 processes the reports received from the traffic and NM agents, and determines additional test steps to be performed responsive to the results. Testing center 80 preferably evaluates network 20 based on the reports and displays test results to an operator 96. The test results may point out a faulty switch or link, and/or may include an evaluation of the state of the network.

Operator 96 may be located next to testing center 80 or may remotely login to the testing center and initiate test sessions from remote locations. Preferably, operator 96 may operate the testing center 80 using a standard Internet browser.

Preferably, testing center 80 may instruct NM agents 70 to change characteristics of network 20 between stages of a test session. For example, testing center 80 may instruct NM agents 70 to connect or disconnect links of network 20, making it possible to pinpoint faults in the network, and/or test backup components which normally are not in use or are bypassed by the traffic.

Figure 2:
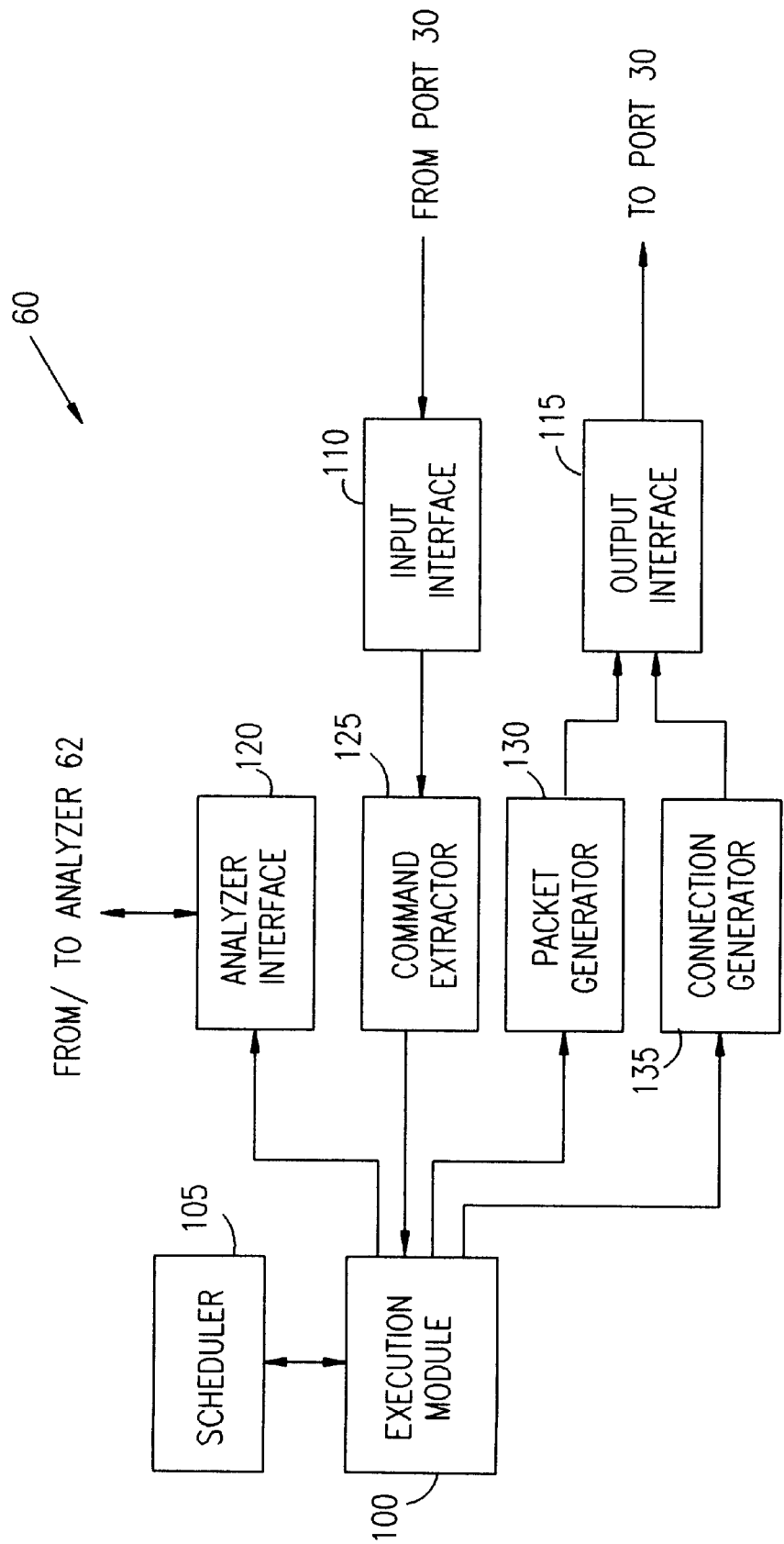
FIG. 2 is a schematic block diagram of a traffic generator, in accordance with a preferred embodiment of the present invention.

FIG. 2 is a schematic block diagram of traffic generator 60, in accordance with a preferred embodiment of the present invention. The blocks in FIG. 2, which form traffic generator 60, are preferably software processes and/or subroutines which run on one of hosts 36. Preferably, the processes of traffic generator 60 may operate substantially concurrently. It is noted, however, that one skilled in the art will be able to implement a similar generator 60 in hardware.

Preferably, traffic generator 60 comprises an input interface 110 and an output interface 15 through which the traffic generator communicates with network 20. Alternatively, a single interface is used by generator 60 to communicate with network 20.

Traffic generator 60 preferably further comprises a command extractor 125 which is connected to interface 110 and recognizes commands from testing center 80 addressed to the generator. An execution module 100 receives the commands recognized by extractor 125 and determines the execution time of the commands. Commands without an execution time and/or condition are preferably carried out by the execution module immediately, while commands which have a condition or execution time are stored in a memory for further use. Preferably, a scheduler 105 continuously checks the times and conditions of the stored commands and initiates the execution of stored commands when appropriate.

In some preferred embodiments of the present invention, some of traffic generators 60 are included in a single, integrated, traffic agent 64, which includes a traffic analyzer 62. Such generators 60 preferably comprise an analyzer interface 120, which directly communicates with the respective analyzer 62. Thus, execution module 100 may receive commands and information directly from analyzer 62 and/or may pass commands directly to the analyzer. In this way, execution module 100 may generate responses to data received by analyzer 62 and/or send data on connections established with analyzer 62, all upon the initiative of a remote agent.

Generator 60 further comprises a packet generator 130 which generates packets (or cells in ATM networks) to be transmitted via output interface 115. Packet generator 130 generates data packets according to parameters of commands received by execution module 100. Preferably, the packets are generated according to a pattern or statistical profile defined in the command. Sample statistical profiles are described further hereinbelow.

Preferably, generator 130 generates the packets in two steps. In a first step, generator 130 prepares, responsive to a received command, entries in a generation table which comprises entries for each packet or batch of packets to be generated. Each entry preferably includes the parameters of the packets as received with the commands. The parameters preferably comprise some or all of the following: a destination address for the packets (or multiple addresses for multicasting and/or broadcasting), an indication of packet type and length, the number of identical packets to be sent in a batch, an indication of the contents of the packets, a protocol to which the packets conform, etc. Another table field for each entry includes an indication of the next entry to be processed. The next entry indication may indicate that there is a gap between the transmissions, a jump to another table entry, or a termination of transmission. Generator 130 preferably determines, for example, using a finite state machine, the next entry to be used for packet generation based on the indications of the entries.

Preferably, the generated packets include dedicated test information in their payload section. The dedicated test information may include, for example, a sequence reference number, a packet order number that identifies the placement of a particular packet in a series of packets, and/or a time stamp. Further preferably, the test information includes timing information which indicates the amount of time which has elapsed since the transmission of a previous packet in the sequence and/or the time between the current packet and the next planned packet in the sequence. Alternatively or additionally, the test information includes certain flags which indicate the state of the generator and/or the end of a series of packets or of a test sequence. For example, such flags may include a code which notifies the receiving analyzer 62 which information it should pass to a generator 60 associated therewith upon the reception of that message. Preferably, such information includes the type and length of the information to be sent back to the originator of the received message. Further alternatively or additionally, the test information includes test messages including data taken verbatim from a command from testing center 80.

In a second step, the packets are preferably composed by a packet composition module (not shown) within generator 130, responsive to the entries in the generation table. Preferably, the composition module also adds the test information to the packets before their transmission.

In networks 20 that are connection-oriented, traffic generator 60 preferably comprises a connection generator 135 which initiates requests to establish connections with traffic analyzers connected in other locations to the network. Connection generator 135 preferably stores the results of the connection establishment, such as a relationship between a requested quality of service (QoS) and a provided QoS.

Preferably, the commands recognized by traffic generators 60 include commands which specify the data to be generated and when the data are to be transmitted. A first command may order generation and transmission of a packet, a stream of packets or a plurality of streams of packets. Such a command may include parameters, such as the addresses of the receiving traffic analyzers and/or the number of bytes in each packet. This number may be fixed, or it may be set according to a predetermined pattern or a random pattern, in accordance with statistical settings which are preprogrammed or received in the command. The statistical settings may follow, for example, a geometric distribution. For example, the number of bytes in each packet may be formed of a fixed number of bytes including test information and a variable number of bytes including random data.

Similarly, the number of packets sent in a single stream and/or the time length of the stream are set according to one or more parameters. Preferably, the one or more parameters also determine the relative timing of the transmission of the packets in the stream, according to a statistical profile. For example, the packets may be transmitted according to a periodic, a Poisson and/or an ON-OFF model. The statistical profile is preferably chosen based on experimental measurements or records of actual network traffic monitored during normal network operation periods.

Further parameters may be used to set the contents of the packets, such as flags which indicate the beginning and end of a stream.

Other commands sent to generator 60 may instruct the generator to save the actual transmission data for further reference and/or to send the actual transmission data to testing center 80.

In connection-oriented networks, the commands to traffic generator 60 preferably include commands to generate connections, so as to allow testing of the ability of network 20 to establish connections between hosts. A command for establishment of a connection (a "call" command) preferably states the number of connections, the times they are to be established, the hosts to connect to, the desired QoS, a list of variables in which the results of the connection establishment attempt are stored, etc.

Table 1 describes a taxonomy of commands for connection generation by traffic generators 60, in accordance with a preferred embodiment of the present invention

TABLE 1

Call:
Protocol:<description of connection protocol>
Call_Reference:<an integer value>
To: <a list of networking addresses of destinations>
QoS Parameters:
Return_variables: <variable list>
Add_Party:
Call_Reference: <an integer value>
To: <a list of networking addresses of destinations>
Return_variables: <variables list>
Drop_Party:
Call_Reference:<an integer value>
To: <a list of networking addresses of destinations>
Generate:
Call_Reference:<an integer value>
Protocol:<description of transport protocol>
Generation_Pattern:<pattern format>
Duration:<period of generation>
Wait:
Duration:<period of waiting>
Get_Analyzer_Parameter:
List: <list of local variables>
Report_To_Testing center:
List: <list of local variables>

Figure 3:
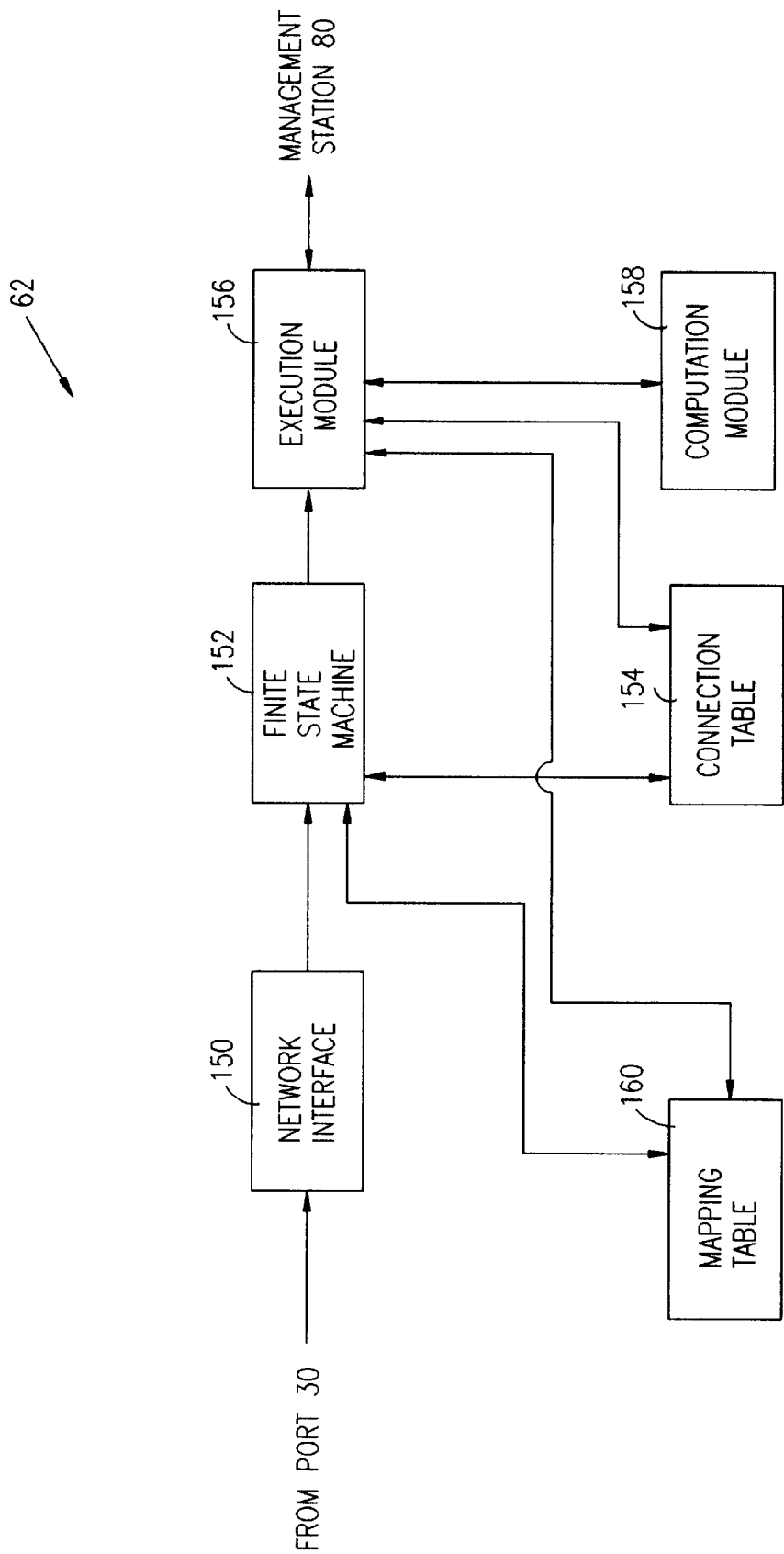
FIG. 3 is a schematic block diagram of a traffic analyzer, in accordance with a preferred embodiment of the present invention.

FIG. 3 is a schematic block diagram of traffic analyzer 62, in accordance with a preferred embodiment of the present invention. Analyzer 62 comprises a network interface 150 which connects to a port 30 of network 20 and receives packets therefrom. Network interface 150 receives packets (usually generated by traffic generators 60) and/or connection establishment requests from network 20. Preferably, network interface 150 determines parameters of each of the received packets, which parameters may include arrival time, identity of the sending generator 60, packet type, packet length, sequence number and the dedicated test information in the payload section of the packet.

Preferably, in connection-oriented networks, network interface 150 may also determine the behavior of connection establishment requests arriving at analyzer 62.

Analyzer 62 preferably comprises a connection table 154 which contains, for each received connection or stream of packets, an entry which summarizes information pertaining to the connection or stream. Preferably, each entry includes information, such as the number of received packets in the stream, a total delay of the stream, a most recent reception time, an accumulated inter-packet timing, the number of lost packets, etc.

Preferably, table 154 includes entries only for connections or streams for which commands from testing center 80 have specifically requested analysis. Alternatively or additionally, table 154 may record substantially all of the received connections and a command from testing center 80 notifies analyzer 62 which connections to report.

The entries of table 154 are preferably identified by the reference number of the stream or connection. Alternatively or additionally, commands from testing center 80 may identify or limit the tracking of desired entries using one or more of the arrival time or transmittal time of the packets, the identity of the transmitting host, the route or a part thereof through which the packets are passed, the contents of the packets, or any other suitable variables.

Preferably, for connections in connection-oriented networks, table 154 summarizes information regarding the connection, such as connection and termination activities, the number of established connections and their final negotiated parameters, the time at which they were received and the inter-call timing. A second copy of this information may reside on the other traffic agent participating in the connection.

A finite state machine 152, preferably implemented by software, updates the entries in table 154 based on the parameters of the received packets. In addition, finite state machine 152 preferably signals a command execution module 156 when a last packet of a stream has been accepted. The last packet in the stream may be identified according to a flag in the packet, or according to an identity number or time stamp of the packet beyond the required range to be tracked. Preferably, a mapping table 160 may be used by finite state machine 152 to access table 154.

Execution module 156 preferably receives commands from testing center 80 and controls the operation of network interface 150 and/or finite state machine 152, preferably by altering the contents of table 154 and/or mapping table 160. A statistics computation module 158 preferably calculates statistics of the received data based on the contents of table 154 and commands from execution module 156. Module 158 preferably prepares reports to be sent to testing center 80, periodically and/or at the end of the test session.

Preferably, the commands recognized by traffic analyzer 62 include commands to track reception of packets with specific identities. Preferably, the commands instruct analyzer 62 to generate entries in table 154 according to any of the variables described hereinabove. Preferably, analyzer 62 controls the reception of packets by adding and/or removing entries in table 154. The tracking commands may include execution conditions such as reception of a specific packet from a traffic generator 60.

Other commands to analyzer 62 include requests for generating traffic reports, preferably based on the information summarized in table 154. These commands preferably state the information required in the reports and the time or times at which the information is to be sent to testing center 80. The reports are preferably generated by statistics computation module 158.

Further commands to analyzer 62 in connection oriented networks preferably include commands to respond to requests to establish connections, and commands to prematurely abort connections, with or without proper notification.

Preferably, traffic agents 60, 62, 64 and 67 may receive control commands in accordance with a general programming language. Thus, testing center 80 may send the traffic agents complex subscripts which include, for example, conditional commands and loops.

Figure 4:
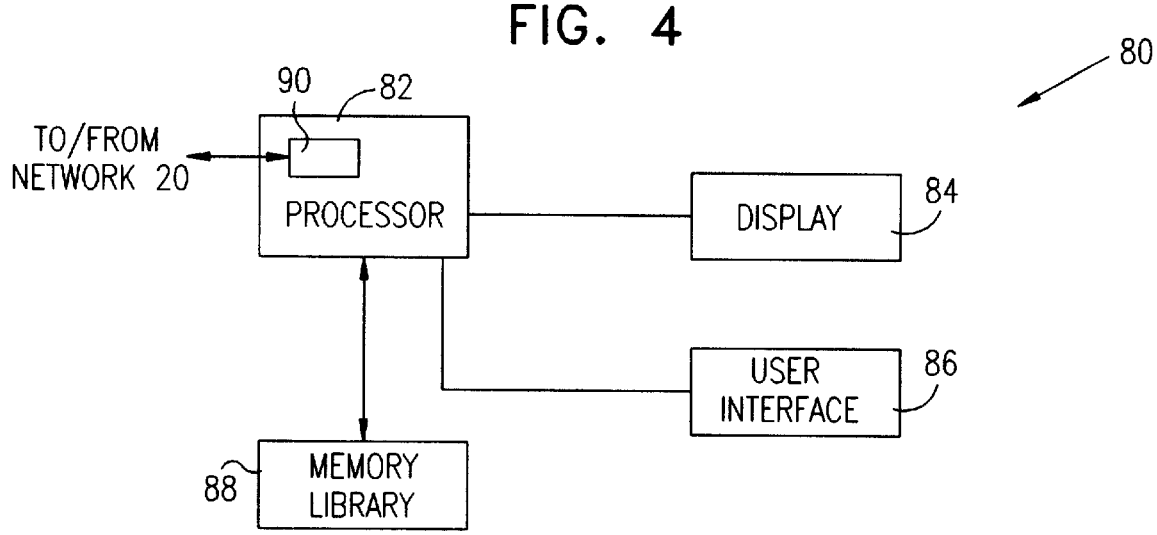
FIG. 4 is a schematic block diagram of a testing center, in accordance with a preferred embodiment of the present invention.

FIG. 4 is a schematic block diagram of testing center 80, in accordance with a preferred embodiment of the present invention. Testing center 80 comprises a processor 82, preferably within a standard graphical work station, which may be, for example, a personal computer. Testing center 80 preferably further comprises a display 84 and a user interface 86, such as a keyboard and/or mouse with which operator 96 initiates test sessions and/or enters commands to be performed during a test session. Preferably, operator 96 may perform an interactive test session in which scripts enabled by the operator are immediately executed, and these scripts trigger the sending of subscripts to one or more of agents 60, 62, 64 and 70, as appropriate. Alternatively or additionally, the operator may prepare instruction scripts to be performed at later times. Preferably, operator 96 may use existing scripts as building blocks for more complex scripts. Further preferably, the scripts include parameters which may be given values and/or altered by the operator.

Preferably, testing center 80 comprises a memory library 88 in which instruction scripts for various test sessions are stored. Testing center 80 may automatically perform a test session according to a script stored in library 88, periodically and/or in response to one or more conditions of network 20, such as in response to alarms generated by network management system 58. Alternatively or additionally, the operator may invoke one or more scripts in library 88.

Preferably, before automatically initiating a test session, testing center 80 checks the traffic volume through certain nodes in the network, preferably by probing NM agents 70. If the volume is relatively high, the test is preferably deferred to a later time so that the test will not interfere with operation of the network. Alternatively or additionally, the script of the automatic test session varies responsive to the traffic volume of the network. Preferably, the traffic volume is periodically assessed during relatively long test sessions to prevent any adverse influences of a long test on traffic which appeared after the test began. Preferably, the testing of the traffic is included in a script which is invoked by other scripts as required.

Testing center 80 preferably comprises a communication adapter 90 (for example, an Ethernet card), through which the testing center communicates with traffic agents 60, 62 and 64 and network management agents 70. Testing center 80 preferably communicates with the agents using a standard protocol, such as the TCP/IP protocol suite.

Table 2 describes a taxonomy of a transmission instruction included in scripts stored in memory library 88, in accordance with a preferred embodiment of the present invention. The transmission instruction causes testing center 80 to send a subscript to one or more of traffic agents 60, 62, 64 and 67.

TABLE 2

Send_Command [-options]
[#At: date and time]
To: <list of recipient traffic agents>
Command_reference_number <number>
[#Type: command_type]
Data: [pointer]
[subscript]
End of Data The transmission instruction is formed of a plurality of directives, some of which are optional directives and are therefore enclosed in brackets ([]) in Table 2. The directives preferably include a time indication at which the subscript is to be transmitted. The directives also include a list of recipient agents to which the subscript is sent. Preferably, the list of recipient agents may include addresses of one or more agents or group addresses which are defined by the operator. Alternatively or additionally, the group addresses are defined according to the tasks of the hardware associated with the agents. Such groups may include, for example, web servers, mail servers, routers, switches, etc.

If no time indication is stated, the list is transmitted immediately after the preceding instruction in the script. Preferably, the transmission instruction includes a reference number which is used to identify the instruction and subsequent reports generated responsive to the instruction.

Further preferably, the transmission instructions may include a directive specifying the type and/or version of the commands in the subscript. The type may state whether the subscript includes a single command or a plurality of commands and/or whether the subscript is in plain text or any other suitable form. Preferably, the receiving agents have a default setting which when used obviates the need to specify the type.

The subscript preferably appears after a #Data directive or may be referenced by a pointer or file name. Preferably, the subscripts reference subroutines pre-stored at the traffic agents. Preferably, a subroutine which is to be performed more than once by a specific traffic agent is sent only once at the beginning of a script or test session to the agent, and the subroutine is thereafter referenced by later subscripts. Alternatively or additionally, some subroutines may be prestored at the agents at their installation time.

It is noted that the above described transmission instruction is stated by way of example, and that any suitable form of instructions may be used. Alternatively or additionally, the taxonomy of the instruction script follows open standards such as Javascript, UNIX shell, tcl/tk etc.

In some preferred embodiments of the present invention, testing center 80 reads the scripts and responsive thereto prepares a subscript to be sent to the one or more recipient agents at the appropriate time. Data received from the agents are preferably classified according to the reference number accompanying the subscript.

Preferably, the commands in the subscripts are as described above in conjunction with the descriptions of the traffic agents 60 and 62. Alternatively or additionally, the general taxonomy of the commands is in accordance with standards known in the art, such as UNIX shell, tcl/tk, SNMP, Java Script macros, etc.

Figure 5:
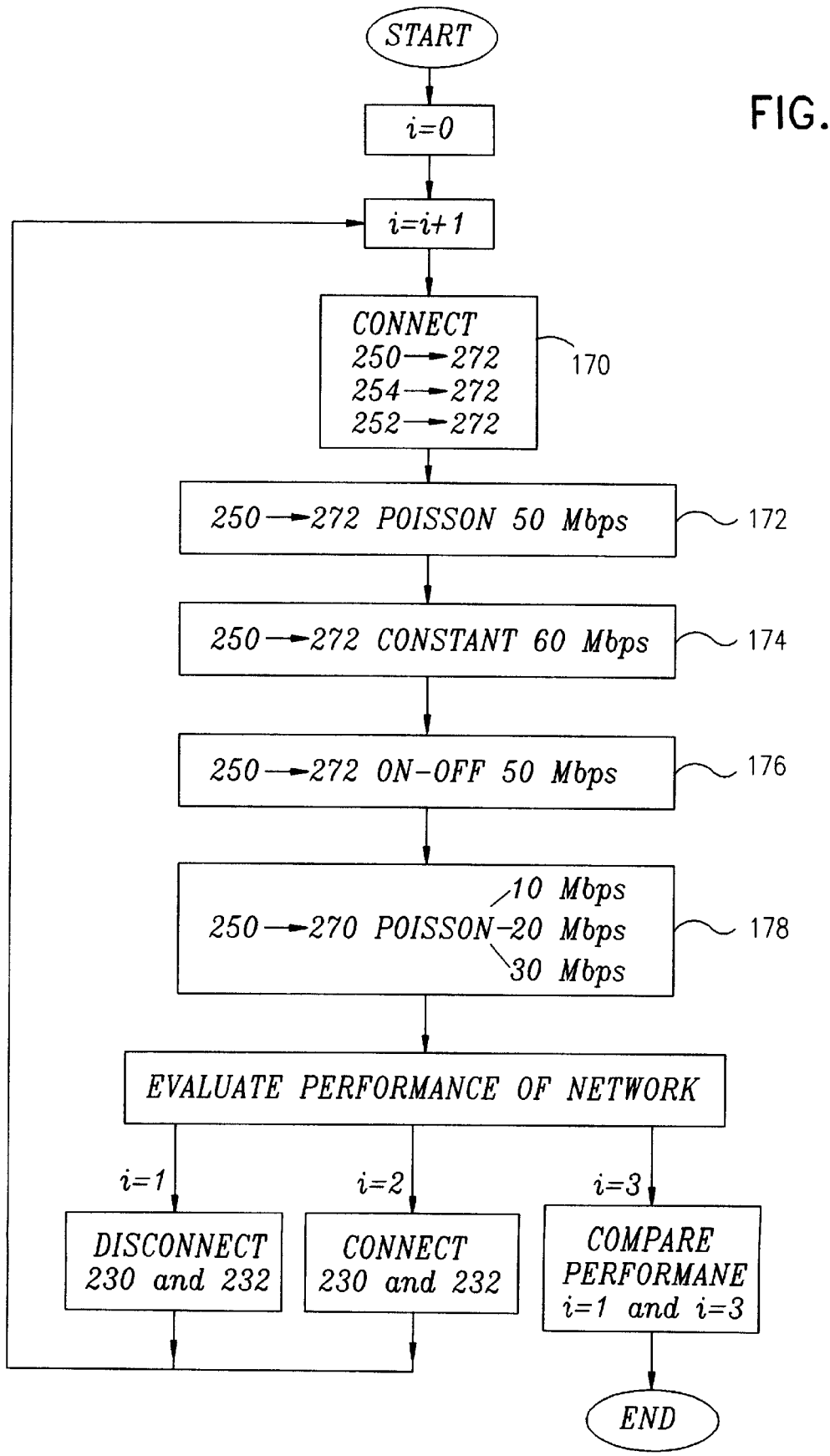
FIG. 5 is a flow chart illustrating a sample test session, in accordance with a preferred embodiment of the present invention.
Figure 6:
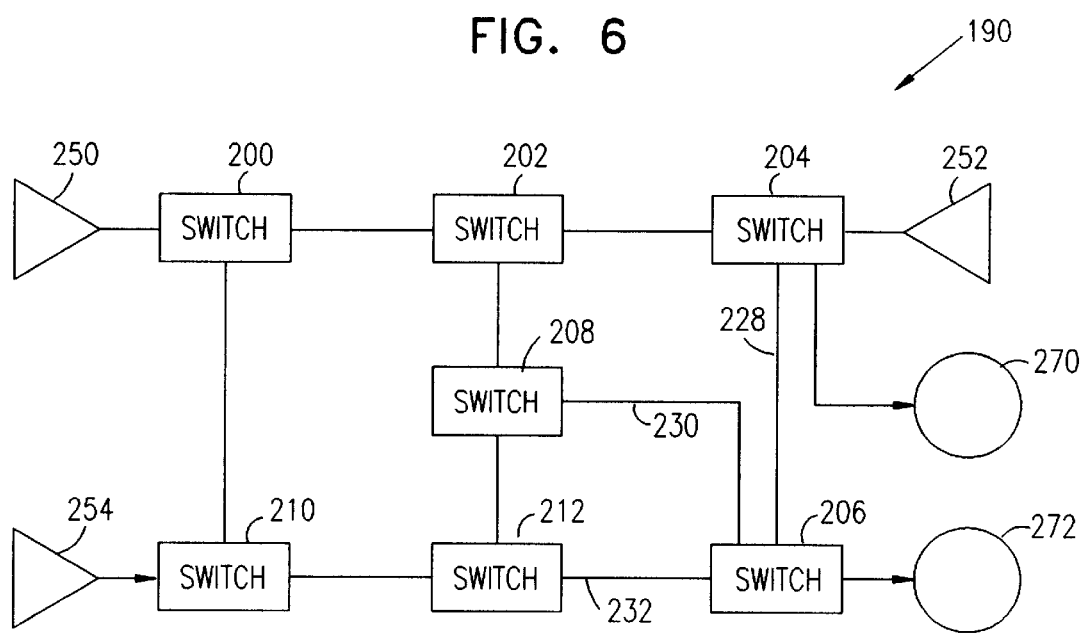
FIG. 6, is a schematic graph of a communication network, on which the sample test session of FIG. 5 is demonstrated.

FIG. 5 is a flow chart illustrating a sample test session, in accordance with a preferred embodiment of the present invention. Reference is also made to FIG. 6, which is a schematic graph of a communication network 190, on which the sample test session is demonstrated. Preferably, the sample test session is implemented by invoking a script stored in memory library 88. Network 190 comprises an ATM standard network in which all the communication links operate at 155 Mbps.

As indicated in block 170, traffic generators 250, 252 and 254 are instructed to establish connections with traffic analyzer 272. Preferably, traffic generators 250, 252 and 254 are instructed to report to testing center 80 when the connections are established. Preferably, a connection is also established between generator 252 and analyzer 270. Preferably, analyzers 270 and 272 are instructed to accept the requests for connection establishment. After about 30 seconds, traffic generator 250 is instructed to generate a stream of packets according to a Poisson random process, at an average rate of 50 Mbps. The stream is sent to analyzer 272, which is instructed to track the stream and report intermediate data flow results to testing center 80 approximately once every 20 seconds.

About 20 seconds later, traffic generator 254 is instructed to generate a stream at a constant rate of 60 Mbps and send the stream to analyzer 272. This stream is also tracked by analyzer 272. After another 20 seconds, generator 252 is instructed to produce an ON-OFF traffic transmission process with an ON period comprising 20% of its total time, at an average rate of 50 Mbps. Preferably, this stream is not tracked and only serves to load network 190 such that the network may be tested with a high load.

Preferably, generator 252 is instructed to send another stream, such as a modulated Poisson source behavior stream, to analyzer 270. The stream preferably has three equal probability states, having transmission rates of 10, 20 and 30 Mbps, each state having an average duration time of 0.1 seconds. Analyzer 270 is preferably instructed to track this stream.

Preferably, during the entire test session, each of switches 204, 206, 208 and 212 is instructed to report periodically on the data flow through the switch.

After a predetermined amount of time, preferably between about 2 and 5 minutes, all of the streams are terminated and testing center 80 receives all of the data from switches 204, 206, 208 and 212 and analyzers 270 and 272. Testing center 80 preferably summarizes the data on the flow control of the network.

Thereafter, switches 206, 208 and 212 are instructed to deactivate links 230 and 232. The steps described in blocks 170, 172, 174, 176, 178 and 180 are then repeated for the partially disconnected network. Thus, the network is tested when all the traffic passes through link 228.

Subsequently, switches 206, 208 and 212 are instructed to re-activate links 230 and 232, and the steps of blocks 170, 172, 174, 176, 178 and 180 are performed for a third time. Thereafter, testing center 80 compares the performance of network 190 before and after links 230 and 232 were deactivated.

Another sample test, especially suited for ATM networks, includes establishing a plurality of connections with various QoS requirements and thereafter checking how well the connections actually support the promised QoS. Likewise, the testing may evaluate the fulfillment by the network of other pre-agreed or non-pre-agreed specifications, such as delay, loss percentage, and jitter.

In other test sessions a link which usually is not in use, for example, a backup link, is tested by disabling one or more links generally used and testing whether the backup link fulfills its assigned purpose. Preferably, the results of testing the network when the one or more links are disabled, are compared to the results of substantially the same test when all the links are enabled to assess the degradation of the ability of the network when an important part is disabled.

It is noted that different scripts and/or test sessions may be directed to different levels of the communication protocols used by the network; specifically, some tests may be directed to the application level. For example, a script used for detecting a problem in a network begins with a set of tests using a low level protocol. If the problem is not detected, the script directs testing center 80 to proceed to perform tests using a higher level protocol. Preferably, the tests continue until the problem is detected. Alternatively or additionally, the order in which the protocol levels are tested may be different than that described above; preferably the order is determined according to the nature of the script.

Figure 7:
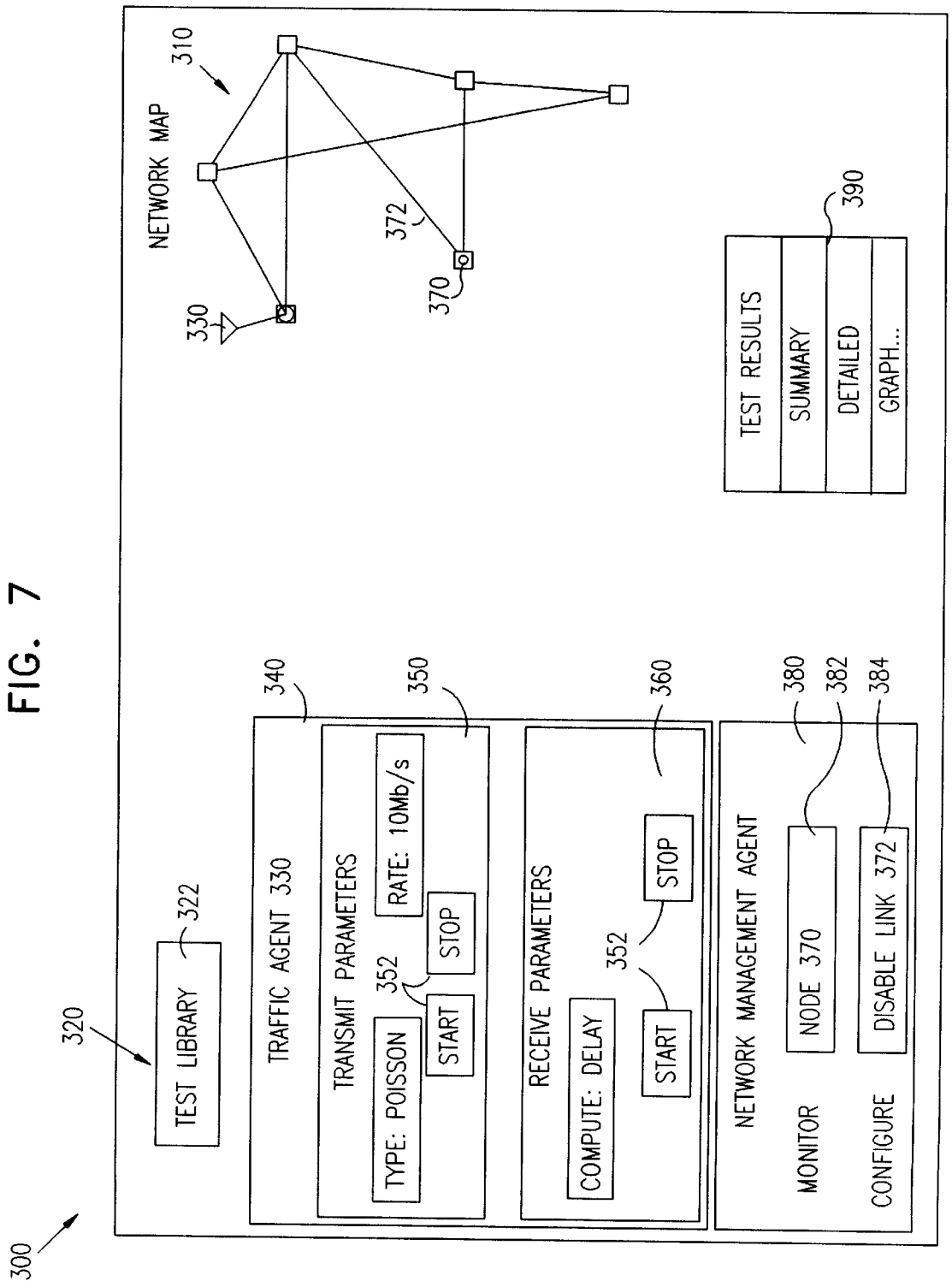
FIG. 7 is a schematic illustration of a graphical user interface (GUI) associated with the test center of FIG. 4, in accordance with a preferred embodiment of the present invention.

FIG. 7 is a schematic illustration of a graphical user interface (GUI) on a screen 300 of test center 80, in accordance with a preferred embodiment of the present invention. Preferably, the GUI on screen 300 contains a network map 310 which contains blocks which represent the switches 24, hosts 36, generators 60, analyzers 62 and network management agents 70 of network 20 which is being tested. For example, a traffic icon 330 represents a traffic generator 60, and an NM icon 370 represents an NM agent 70. Preferably, links 26 are represented by lines 372. Preferably, operator 96 can use clicking and drag and drop operations upon the map blocks in order to design and build new test scripts or determine the parameters of a test script contained in library 88. Preferably, the GUI includes a test library list 320 which lists all the available tests in library 88. Preferably, list 320 is sorted and grouped according to various cuts that allow easy access of operator 96 to the scripts in library 88. Preferably, operator 96 accesses a script by clicking on a pull down icon 322, as is known in the art.

Preferably, upon clicking on the blocks of network map 310, respective windows open which allow setting parameters of test scripts. For example, upon clicking on traffic icon 330, a traffic agent window 340 pops up with proper fields for entering parameters of instructions of the scripts. Such fields include, for example, a transmit field 350 and a receive field 360 for inputting respective parameters of the scripts. Preferably, the parameters of transmit field 350 include fields which indicate the type of the transmitted stream, e.g., Poisson, and its rate, e.g., 10 Mb/s. The parameters of receive field 360 include a list of variables to be measured, e.g., delay.

Preferably, fields 350 and 360 include start and stop buttons 352 which are used to begin and end transmission of traffic streams. Alternatively or additionally, other icons may be used to indicate the timing of the streams. Preferably, upon clicking on NM icon 370, a network management window 380 opens with fields for setting parameters related to the NM agent represented by icon 370. The network management window 380 preferably includes a monitoring field 382 which is used to set monitoring parameters, such as the source of traffic to be monitored, and a configuration field 384, which is used to change the configuration of network 20, e.g., enable and disable links of the network.

Preferably, the GUI also includes fields which display the test results in various forms such as a condensed or a detailed summary of the results of the test, or presenting the results using graphical tools.

In some preferred embodiments of the present invention, testing system 22 comprises more than one testing center 80. Preferably, each testing center sends instructions to and receives reports from a group of traffic agents. Preferably, the groups of traffic agents are exclusive, and one traffic agent does not receive instructions from more than one testing center 80. Alternatively or additionally, each testing center 80 may send instructions to and receive reports from every traffic agent. Preferably, one of the testing centers 80 sends instructions to and receives reports from the rest of the testing centers.

It will be appreciated that the preferred embodiments described above are cited by way of example, and the full scope of the invention is limited only by the claims.

What is claimed is:

1. A method for testing a network having a plurality of nodes, comprising:

sending commands to one or more traffic agents connected to the network and to at least one network management agent coupled to a respective node of the network;

transmitting data from at least one of the traffic agents over the network to a destination responsive to the commands;

determining network information at the at least one network management agent responsive to the commands and to transmission of the data through the respective node, intermediate the at least one of the traffic agents and the destination; and receiving and evaluating the network information to assess a state of the network.

2. A method according to claim 1, wherein sending the commands comprises sending commands to the one or more traffic agents and to the at least one network management agent from a single source.

3. A method according to claim 1, wherein sending the commands comprises sending commands over the network.

4. A method according to claim 1, wherein the destination comprises a second one of the traffic agents, and comprising receiving at least some of the transmitted data at the destination and deriving additional network information at the second traffic agent, responsive to the commands.

5. A method according to claim 4, wherein deriving the additional network information comprises determining a response time property of the transmitted data.

6. A method according to claim 1, wherein determining network information comprises capturing data transmitted by at least one of the plurality of the traffic agents.

7. A method according to claim 1, wherein transmitting the data comprises multicasting the data.

8. A method according to claim 1, wherein sending the commands comprises sending a pre-stored subscript of commands.

9. A method according to claim 8, wherein sending the subscript comprises sending a subscript which includes execution times for at least some of the commands.

10. A method according to claim 8, wherein sending the subscript comprises sending a subscript which is written in accordance with a general programming language.

11. A method according to claim 1, wherein sending the commands to the at least one network management agent comprises sending commands according to a public network management standard.

12. A method according to claim 1, wherein sending the commands comprises sending commands in accordance with a script.

13. A method according to claim 12, wherein sending the commands comprises initiating the script responsive to an alarm generated by the network.

14. A method according to claim 13, wherein initiating the script comprises initiating the script responsive to an alarm generated by a network management system.

15. A method according to claim 12, wherein the script comprises instructions to be performed in a plurality of test stages, and wherein at least one of the test stages is chosen responsive to results of a previous test stage.

16. A method according to claim 1, wherein sending the commands comprises sending at least one of the commands responsive to the received network information.

17. A method according to claim 16, wherein sending the at least one of the commands comprises sending commands responsive to a measure of an amount of traffic passing through the network.

18. A method according to claim 1, and comprising sending a command to a network management agent to change a traffic characteristic of the network at one or more of the plurality of nodes.

19. A method according to claim 18, wherein changing the traffic characteristic comprises altering the operability of a link of the network.

20. A method according to claim 19, wherein evaluating the network information to assess the state of the network comprises determining whether a first part of the network operates properly by disabling a second part of the network and transmitting the data through the first part while the second part is disabled.

21. A method according to claim 1, wherein transmitting the data comprises transmitting data according to a statistical transmission time pattern.

22. A method according to claim 1, wherein transmitting the data comprises transmitting a request to establish a communication connection.

23. A method according to claim 1, wherein transmitting the data comprises transmitting data in accordance with a standard application protocol.

24. A method according to claim 23, wherein evaluating the network information comprises determining whether a fault in the network is in the application or in the network.

25. A method according to claim 1, wherein transmitting the data comprises transmitting at least one packet of data which includes one or more fields of test information.

26. A method according to claim 25, wherein the test information comprises a time stamp, a sequence number or a connection identification.

27. A method according to claim 25, and comprising receiving the transmitted data at one of the traffic agents and determining network-related performance information at the traffic agent which received the transmitted data responsive to the commands and the test information.

28. A method according to claim 1, wherein evaluating the network information to assess the state of the network comprises locating a network fault.

29. Apparatus for testing a network having a plurality of nodes, comprising:

a plurality of traffic agents which generate and transmit data over the network;

one or more network management agents coupled to respective nodes of the network intermediate the traffic agents, which determine network information at the respective nodes; and a testing center which sends commands to the plurality of traffic agents to generate and transmit the data and to the one or more network management agents to determine the network information responsive to transmission of the data through the respective nodes, and which receives and evaluates the network information from the one or more network management agents so as to assess performance of the network responsive to the transmitted data.

30. Apparatus according to claim 29, wherein the testing center sends the commands over the network.

31. Apparatus according to claim 29, wherein at least one of the traffic agents receives the transmitted data and derives additional network information, responsive to commands from the testing center.

32. Apparatus according to claim 29, wherein the network information comprises a response time property of the transmitted data.

33. Apparatus according to claim 29, wherein the network information comprises a throughput of the transmitted data.

34. Apparatus according to claim 29, wherein at least one of the traffic agents multicasts the data.

35. Apparatus according to claim 29, wherein the testing center comprises a memory in which one or more scripts of instructions are stored.

36. Apparatus according to claim 35, wherein the testing center comprises a user interface which enables a user to invoke the scripts.

37. Apparatus according to claim 36, wherein the user interface comprises a graphical user interface which allows a user to create some or all of the scripts.

38. Apparatus according to claim 37, wherein the graphic user interface allows the user to change parameters of the scripts.

39. Apparatus according to claim 29, wherein at least one of the network management agents changes a traffic characteristic of the network responsive to the commands.

40. Apparatus according to claim 39, wherein the at least one of the network management agents alters the operability of a link of the network.

41. Apparatus according to claim 29, wherein the at least one of the network management agents captures the transmitted data.

42. Apparatus according to claim 29, wherein the network management agent comprises a Remote Monitoring agent.

43. Apparat us according to claim 29, wherein the plurality of traffic agents comprise at least one traffic agent which is internal to a node of the network.

44. Apparatus according to claim 29, wherein the plurality of traffic agents comprise at least one traffic agent which is implemented as an integral part of one of the network management agents.

* * * * *